US008815317B2

(12) United States Patent
Lafferty et al.

(10) Patent No.: US 8,815,317 B2
(45) Date of Patent: Aug. 26, 2014

(54) ELEVATED MICROWAVE HEATING CONSTRUCT

(75) Inventors: Terrence P. Lafferty, Neenah, WI (US); Lorin R. Cole, Larsen, WI (US); Scott W. Middleton, Oshkosh, WI (US)

(73) Assignee: Graphic Packaging International, Inc., Atlanta, GA (US)

(*) Notice: Subject to any disclaimer, the term of this patent is extended or adjusted under 35 U.S.C. 154(b) by 802 days.

(21) Appl. No.: 12/655,817

(22) Filed: Jan. 7, 2010

(65) Prior Publication Data

US 2010/0178396 A1 Jul. 15, 2010

Related U.S. Application Data

(60) Provisional application No. 61/143,858, filed on Jan. 12, 2009.

(51) Int. Cl.
| | | |
|---|---|---|
| *A21D 10/02* | (2006.01) | |
| *B65D 81/34* | (2006.01) | |
| *H05B 6/80* | (2006.01) | |
| *B65D 5/30* | (2006.01) | |
| *H05B 6/64* | (2006.01) | |
| *A47J 27/088* | (2006.01) | |
| *A47J 36/02* | (2006.01) | |

(52) U.S. Cl.
CPC .......... *H05B 6/6408* (2013.01); *B65D 81/3453* (2013.01); *B65D 5/302* (2013.01); *A47J 27/088* (2013.01); *A47J 36/02* (2013.01); *H05B 6/6491* (2013.01); *B65D 2581/3406* (2013.01); *Y10S 229/903* (2013.01); *Y10S 229/905* (2013.01); *Y10S 229/906* (2013.01)
USPC .......... 426/107; 426/113; 426/234; 426/243; 426/241; 219/728; 219/730; 219/732; 229/903; 229/905; 229/906

(58) Field of Classification Search
USPC .......... 426/107, 113, 234, 241–243; 219/730, 219/732, 728–729; 229/242, 902–903, 906, 229/161, 170, 120.27, 120.32; 206/750, 206/45.21, 784; D9/432
See application file for complete search history.

(56) References Cited

U.S. PATENT DOCUMENTS 2,944,725 A * 7/1960 Hayes .................. 229/125.36
4,192,443 A * 3/1980 McLaren ................ 229/120.14
(Continued)

FOREIGN PATENT DOCUMENTS

EP  0 451 530 A2  10/1991
FR  745 013  5/1933
(Continued)

OTHER PUBLICATIONS

International Search Report—PCT/US2006/035503.
(Continued)

*Primary Examiner* — Drew Becker
*Assistant Examiner* — Luana Z Long
(74) *Attorney, Agent, or Firm* — Womble Carlyle Sandridge & Rice, LLP

(57) ABSTRACT

A microwave heating construct includes a platform having a plurality of peripheral edges, a plurality of elevating panels for maintaining the platform in a raised position, and a layer of microwave energy interactive material overlying at least a portion of the platform. The platform includes a movable portion defined at least partially by a line of disruption extending substantially between a pair of adjacent edges of the platform. The movable portion of the platform is adapted to pivot along the line of disruption.

56 Claims, 4 Drawing Sheets

(56) References Cited

U.S. PATENT DOCUMENTS

| | | | |
|---|---|---|---|
| 4,192,540 A | 3/1980 | Oliff | |
| 4,210,124 A | 7/1980 | Hertel | |
| 4,228,945 A * | 10/1980 | Wysocki | 229/120.011 |
| 4,260,060 A * | 4/1981 | Faller | 229/104 |
| 4,283,427 A | 8/1981 | Winters et al. | |
| 4,505,391 A | 3/1985 | Kuchenbecker | |
| 4,592,914 A * | 6/1986 | Kuchenbecker | 426/107 |
| 4,705,929 A * | 11/1987 | Atkinson | 219/730 |
| 4,775,771 A | 10/1988 | Pawlowski | |
| 4,801,774 A | 1/1989 | Hart | |
| 4,826,072 A * | 5/1989 | Hart | 229/104 |
| 4,865,921 A | 9/1989 | Hollenberg | |
| 4,871,111 A * | 10/1989 | Mode | 229/104 |
| 4,877,932 A | 10/1989 | Bernstein | |
| 4,890,439 A | 1/1990 | Smart | |
| 4,916,280 A * | 4/1990 | Havette | 219/731 |
| 4,936,935 A | 6/1990 | Beckett | |
| 4,943,456 A | 7/1990 | Pollart et al. | |
| 4,963,424 A | 10/1990 | Beckett | |
| 5,002,826 A | 3/1991 | Pollart et al. | |
| 5,093,364 A | 3/1992 | Richards | |
| 5,117,078 A | 5/1992 | Beckett | |
| 5,118,747 A | 6/1992 | Pollart et al. | |
| 5,213,902 A | 5/1993 | Beckett | |
| 5,221,419 A | 6/1993 | Beckett | |
| 5,223,685 A * | 6/1993 | DeRienzo, Jr. | 219/732 |
| 5,247,149 A | 9/1993 | Peleg | |
| 5,260,537 A | 11/1993 | Beckett | |
| 5,266,386 A | 11/1993 | Beckett | |
| RE34,683 E | 8/1994 | Maynard | |
| 5,340,436 A | 8/1994 | Beckett | |
| 5,354,973 A | 10/1994 | Beckett | |
| 5,410,135 A | 4/1995 | Pollart | |
| 5,412,187 A | 5/1995 | Walters et al. | |
| 5,424,517 A | 6/1995 | Habeger | |
| 5,519,195 A | 5/1996 | Keefer | |
| 5,530,231 A | 6/1996 | Walters et al. | |
| 5,544,806 A | 8/1996 | Anderson | |
| 5,628,921 A | 5/1997 | Beckett | |
| 5,672,407 A | 9/1997 | Beckett | |
| 5,688,427 A | 11/1997 | Gallo | |
| 5,759,422 A | 6/1998 | Schmelzer | |
| 5,800,724 A | 9/1998 | Habeger | |
| 6,114,679 A | 9/2000 | Lai | |
| 6,150,646 A | 11/2000 | Lai et al. | |
| 6,204,492 B1 | 3/2001 | Zeng et al. | |
| 6,251,451 B1 | 6/2001 | Zeng | |
| 6,359,272 B1 | 3/2002 | Sadek | |
| 6,414,290 B1 | 7/2002 | Cole | |
| 6,433,322 B2 | 8/2002 | Zeng et al. | |
| 6,455,827 B2 | 9/2002 | Zeng | |
| 6,552,315 B2 | 4/2003 | Zeng et al. | |
| 6,677,563 B2 | 1/2004 | Lai | |
| 6,717,121 B2 | 4/2004 | Zeng | |
| 6,765,182 B2 | 7/2004 | Cole | |
| 7,514,659 B2 | 4/2009 | Lafferty | |
| 7,793,821 B2 * | 9/2010 | Oliveira | 229/104 |
| 8,008,609 B2 | 8/2011 | Noyelle et al. | |
| 8,071,924 B2 | 12/2011 | Lafferty | |
| 8,183,506 B2 | 5/2012 | Fitzwater | |
| 8,217,325 B2 | 7/2012 | Russell et al. | |
| 2004/0149746 A1 | 8/2004 | Hoese et al. | |
| 2006/0049190 A1 | 3/2006 | Middleton | |
| 2007/0056962 A1 * | 3/2007 | Hopkins et al. | 219/730 |
| 2007/0087090 A1 | 4/2007 | Russell | |
| 2007/0228036 A1 * | 10/2007 | Noyelle et al. | 219/730 |
| 2008/0023469 A1 | 1/2008 | Fitzwater | |
| 2008/0035634 A1 | 2/2008 | Zeng et al. | |
| 2008/0041925 A1 | 2/2008 | Cambay | |
| 2008/0175959 A1 * | 7/2008 | Hill et al. | 426/90 |
| 2009/0120929 A1 | 5/2009 | Lafferty | |
| 2009/0218338 A1 | 9/2009 | Fitzwater | |
| 2009/0230126 A1 | 9/2009 | Fitzwater | |
| 2010/0038359 A1 * | 2/2010 | Laubhan et al. | 219/730 |
| 2010/0055260 A1 * | 3/2010 | Sweet | 426/243 |
| 2010/0059511 A1 * | 3/2010 | Gowens et al. | 219/730 |
| 2010/0213192 A1 | 8/2010 | Middleton et al. | |
| 2011/0132903 A1 | 6/2011 | Cole | |
| 2012/0000905 A1 | 1/2012 | Noyelle et al. | |
| 2012/0100265 A1 | 4/2012 | Lafferty | |
| 2012/0187114 A1 | 7/2012 | Fitzwater | |
| 2012/0193351 A1 | 8/2012 | Russell et al. | |

FOREIGN PATENT DOCUMENTS

| | | |
|---|---|---|
| FR | 961 269 | 5/1950 |
| GB | 925 971 | 5/1963 |
| GB | 2 127 677 A | 4/1984 |
| GB | 2 150 534 A | 7/1985 |
| JP | 08-253236 A | 10/1996 |
| JP | 2008-127043 A | 6/2008 |
| KR | 10-1998-0048713 A | 9/1998 |
| KR | 20-2008-0001059 U | 5/2008 |
| WO | WO 93/19566 A1 | 9/1993 |
| WO | WO 2006/076501 A1 | 7/2006 |
| WO | WO 2007/033183 A1 | 3/2007 |
| WO | WO 2007/123611 A1 | 11/2007 |
| WO | WO 2007/127371 A2 | 11/2007 |
| WO | WO 2008/014377 A2 | 1/2008 |
| WO | WO 2008033396 A2 * | 3/2008 |
| WO | WO 2008/052096 A1 | 5/2008 |
| WO | WO 2008/115272 A2 | 9/2008 |
| WO | WO 2008/144343 A2 | 11/2008 |
| WO | WO 2010/019758 A2 | 2/2010 |
| WO | WO 2010/081059 A2 | 7/2010 |
| WO | WO 2011/071690 A2 | 6/2011 |
| WO | 2010/020580 | 7/2011 |
| WO | 2010/057747 | 8/2011 |
| WO | 2010/057747 | 6/2012 |

OTHER PUBLICATIONS

Written Opinion—PCT/US2006/035503.
International Search Report—PCT/US2007/081462.
Written Opinion—PCT/US2007/081462.
International Search Report—PCT/US2007/082477.
Written Opinion—PCT/US2007/082477.
International Search Report for PCT/US2010/020580, mailed Aug. 19, 2010.
Written Opinion for PCT/US2010/020580, mailed Aug. 19, 2010.

* cited by examiner

ELEVATED MICROWAVE HEATING CONSTRUCT

CROSS-REFERENCE TO RELATED APPLICATION

This application claims the benefit of U.S. Provisional Application No. 61/143,858, filed Jan. 12, 2009, which is incorporated by reference herein in its entirety.

TECHNICAL FIELD

Constructs or apparatuses for heating or cooking a food item in a microwave oven are disclosed. In particular, this disclosure relates to various constructs for heating or cooking a food item in a microwave oven, where the food item has a surface that is intended to be browned and/or crisped.

BACKGROUND

Microwave ovens provide a convenient means for heating a variety of food items, including dough-based products such as pizzas, pies, and sandwiches. However, microwave ovens tend to cook such items unevenly and are unable to achieve the desired balance of thorough heating and a browned, crisp crust. Thus, there is a continuing need for a microwavable construct or package that provides the desired degree of heating, browning, and crisping of the crust or dough of a food item.

SUMMARY

This disclosure is directed generally to a construct or apparatus for preparing a food item in a microwave oven. The construct generally includes a heating surface for receiving the food item and a plurality of support elements that maintain the heating surface in an elevated position, such that the heating surface serves as a platform distanced from the turntable and/or the interior floor of the microwave oven. The platform includes at least one movable portion that can be brought into close proximity to the surface of the food item.

If desired, the heating surface may include a microwave energy interactive element that alters the effect of microwave energy on an adjacent food item. In one example, the microwave energy interactive element comprises a susceptor, i.e., a thin layer of microwave energy interactive material (generally less than about 100 angstroms in thickness, for example, from about 60 to about 100 angstroms in thickness, and having an optical density of from about 0.15 to about 0.35, for example, about 0.21 to about 0.28) that tends to absorb at least a portion of impinging microwave energy and convert it to thermal energy (i.e., heat) at the interface with the food item. Susceptors often are used to promote browning and/or crisping of the surface of a food item. When a susceptor is used on the elevated heating surface of the construct, more heat may be retained by and/or directed to the food item, rather than being lost to the turntable or to the floor of the microwave oven. As a result, the microwave heating efficiency is improved significantly. However, other microwave energy interactive elements may be used.

In some embodiments, the susceptor may be joined to the movable portion of the platform. In this manner, the movable portion may be adjusted to bring the susceptor into closer proximity to the food item.

The construct may be used to prepare various food items in a microwave oven, for example, pizza, sandwiches, savory or sweet pastries, breaded food items, or any other food item that desirably is heated, browned, and/or crisped.

If desired, the construct may be folded flat and/or may be used in a partially erected state as a tray for containing the food item. The construct may be formed from a blank comprising a disposable and/or recyclable material, for example, paperboard.

Additional aspects, features, and advantages of the present invention will become apparent from the following description and accompanying figures.

BRIEF DESCRIPTION OF THE DRAWINGS

The description refers to the accompanying drawings in which like reference characters refer to like parts throughout the several views, and in which.

DESCRIPTION

The present invention may be understood further by referring to the figures. For simplicity, like numerals may be used to describe like features. It will be understood that where a plurality of similar features are depicted, not all of such features necessarily are labeled on each figure. It also will be understood that various components used to form the blanks and constructs of the present invention may be interchanged. Thus, while only certain combinations are illustrated herein, numerous other combinations and configurations are contemplated hereby.

Figure 1A:
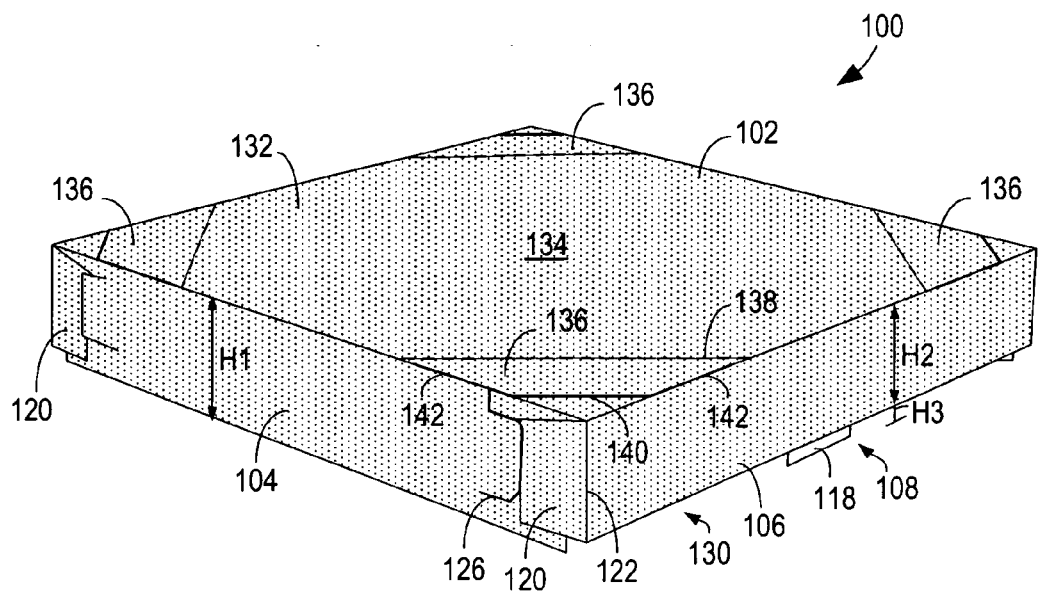
FIG. 1A is a schematic perspective view of an exemplary microwave heating construct including a plurality of adjustable susceptor walls.

FIG. 1A is a schematic perspective view of an exemplary construct 100 for heating, browning, and/or crisping a food item in a microwave oven. The construct 100 includes a main panel 102 that serves as a platform for supporting a food item (not shown). The main panel or platform 102 has a substantially planar construction, such that the platform 102 can be said to lie within a substantially horizontal theoretical plane. However, it will be understood that depending on the material used to form the platform 102 and the particular food item seated on the platform 102, the platform 102 may flex upwardly downwardly somewhat, or may otherwise bend or twist. Thus, it will be understood that the "plane" of the main panel or platform 102 (or any other panel) refers an approximation of the plane in which the main panel or platform 102 generally lies and should not be bound to strict or precise mathematical definitions, calculations, or measurements.

In this example, the main panel or platform 102 has a generally square shape suitable, for example, for use with a pizza or a sandwich. However, it will be understood that the platform 102 may have any other suitable shape and configuration. The precise shape of the platform 102 may be determined by the shape of the food item, and it should be understood that different constructs are contemplated for different food items, for example, sandwiches, pizzas, French fries, soft pretzels, pizza bites, cheese sticks, pastries, doughs, and so forth. Examples of other shapes encompassed hereby include, but are not limited to, polygons, circles, ovals, or any other regular or irregular shape. The platform 102 may be sized and shaped to receive one portion or multiple portions of one or more different food items.

Still viewing FIG. 1A, the construct 100 includes plurality of elevating panels or support elements extending downwardly from the platform 102. In this example, the construct 100 includes two pairs of opposed peripheral or side support elements or elevating panels 104, 106 (only one of each can be seen in FIG. 1A), each of which generally comprises a panel foldably joined to a respective peripheral edge of the platform 102. However, additional and/or differently configured elevating panels may be used.

The construct 100 also includes a transverse or center support element or elevating panel 108 (best seen in FIG. 1B) that extends at least partially across the platform 102 in a manner that seeks to prevent the platform 102 from flexing downwardly or sagging under the weight of a food item. In this example, the transverse or center support element 108 extends between peripheral support elements 106, but in other embodiments the transverse support element 108 could extend between peripheral support elements 104, or in some embodiments, may be omitted.

Figure 1B:
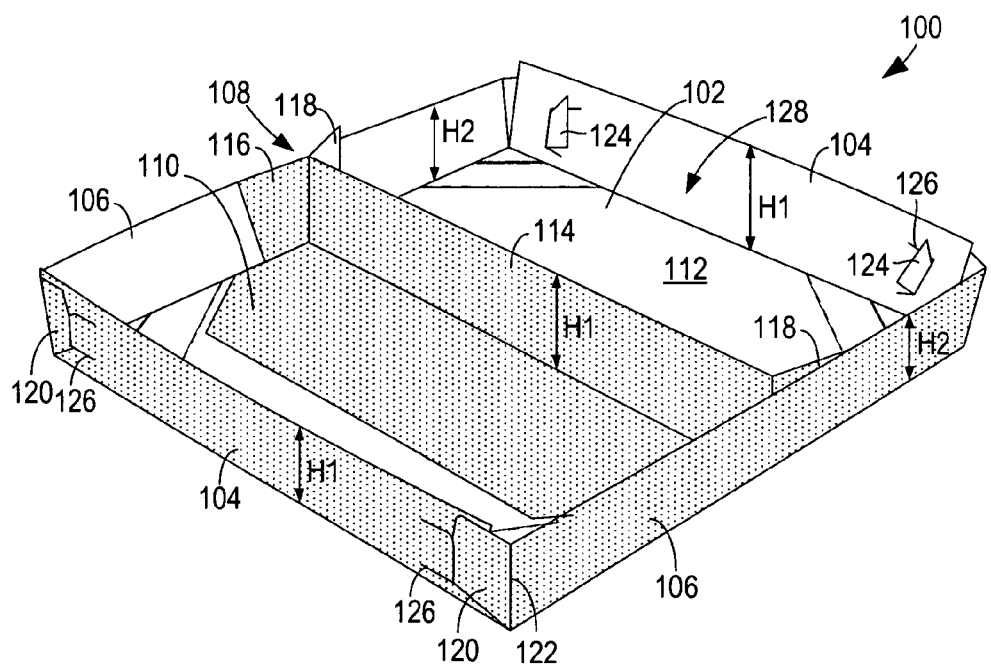
FIG. 1B schematically illustrates the microwave heating construct of FIG. 1A in an inverted configuration.

As shown in FIG. 1B with the construct 100 in an inverted configuration, the transverse support element 108 comprises a plurality of adjoined panels including a major panel 110 in a facing, substantially contacting relationship with the bottom side 112 of the platform 102, a minor, elevating center support panel 114 foldably joined to the major panel 110, a pair of opposed end panels 116 (only one of which is visible in FIG. 1B) foldably joined to the major panel 110, and a pair of elevating corner panels 118 foldably joined to the respective end panels 116 and the center support panel 114. The end panels 116 are disposed in a facing, substantially contacting relationship with, and may be joined to, the support elements 106.

If desired, adjacent pairs of panels 104, 106 may be joined to one another to add further structural stability to the construct 100. In this example, the construct 100 includes a pair of end flaps 120 foldably joined to opposite ends of panels 106 along lines of disruption, for example, fold lines 122, which serve as corners or corner edges of the construct 100. Each end flap 120 includes a locking projection 124 that engages a respective locking slit 126 in the adjacent panel 104, such that the end flaps 120 are maintained in a substantially facing, contacting relationship with the respective panels 104. In other embodiments, the end flaps 120 may extend from panels 104 and engage panels 106. Further, while one means of joining the adjacent pairs of panels 104, 106 to one another is illustrated, the adjacent pairs of panels 104, 106 may be joined in any manner, for example, using an adhesive or other suitable material or fastening technique (not shown).

As shown in FIGS. 1A and 1B, panels 104, 106, 114, 118 generally form non-zero angles with respect to the platform 102, and in one example, panels 104, 106, 114, 118 are substantially perpendicular to the platform 102. In this configuration, each of the various support elements or panels 104, 106, 114, 118 can be characterized as having a vertical dimension or height, which generally describes a distance between the platform 102 and the distal edge of the respective panel 104, 106, 114, 118 (i.e., the lowermost edge in FIG. 1A and the uppermost edge in FIG. 1B). In the illustrated embodiment, the respective heights H1 of panels 104, 114, 118 are substantially equal, and the height H2 of panels 106 is less than the respective heights H1 of panels 104, 114, 118. Thus, the platform 102 may generally have a height or substantially vertical dimension approximately equal to that of panels 104, 114, 118.

Panels 104, 114, 118 generally maintain the platform 102 in an elevated position and at least partially define a void 128 beneath the platform 102, while panels 106 provide structural support to the construct 100 and define gaps 130 (FIG. 1A) that facilitate the movement of air through the void 128 beneath the platform 102. The height H3 (FIG. 1A) of the gap 130 generally can be defined as the difference in height between panels 104, 114, 118 and panels 106, or H1-H2. The precise gap height H3 may vary for a particular application, with a larger gap being used where more circulation is required, and a smaller gap being used where less circulation is needed. In one particular example, H1 may be about 0.875 in., H2 may be about 0.750 in., and H3 may be about 0.125 in. Numerous other heights and other construct dimensions are contemplated. The particular dimensions may depend on the type of food item being heated, the desired heating time, the desired degree of browning and/or crisping, or any other suitable criteria. It also is contemplated that the all of the support elements may have the same height, such that the gap height is zero.

If desired, a microwave energy interactive element 132 (shown schematically with stippling throughout the figures) may overlie, may be joined to, and/or may define at least a portion of a food-contacting side or surface 134 of the platform 102 and, if desired, the outer (exposed) surface of the various other panels, for example, all or a portion of support elements or panels 104, 106 and/or end flaps 120. In one example, the microwave energy interactive element comprises a susceptor that promotes browning and/or crisping of an outer surface of an adjacent food item. However, other microwave energy interactive elements, such as those described below, are contemplated for use with the invention.

It will be understood that some food items, for example, deep dish pizzas, have a curved or contoured peripheral surface that may not be able to be browned and/or crisped sufficiently by the susceptor 132 on the substantially planar platform 102. Accordingly, at least a portion of the platform 102 may be reconfigured to bring the microwave energy interactive element 132 into closer proximity with the sides of the food item. For example, the construct 100 may include one or more lines of disruption that define one or more panels or separable portions that may be transformed into side walls for the platform 102.

In FIG. 1A, the exemplary construct 100 includes four movable portions 136, each of which is defined at least partially by a one or more lines of disruption in the platform 102, for example, an oblique fold line 138 and an oblique cut line 140 (e.g., a slit or tear line), each of which extends substantially between a respective pair of adjacent peripheral support panels 104, 106. Each movable portion 136 also may be defined by a pair of lines of disruption 142 (e.g., tear lines or slits) extending along the peripheral edge of the platform 102 between the respective endpoints of the fold line 138 and cut line 140. The movable portions 136 may be transformed into adjustable, upstanding microwave energy interactive walls for the platform 102 by grasping the respective wall portion 136 proximate to cut line 140, tearing along tear lines 142 (where provided) and folding along fold line 138, as illustrated schematically in FIG. 1C. In doing so, the walls 136 are struck from the platform 102, thereby defining a plurality of cutouts 144 in open communication with the void 128 beneath the platform 102. In this example, oblique fold line 138 and oblique cut line 140 are substantially parallel to one another, such that the adjustable side wall portions or side walls 136 and corresponding cutouts 144 have a substantially trapezoidal shape. However, numerous other shapes and configurations are contemplated.

It is contemplated that each of the walls 136 may be configured in numerous ways to accommodate the shape and dimensions of the food item seated on the platform 102, with fold lines 138 serving as hinges that allow the walls 136 to be adjusted individually. In the example illustrated schematically in FIG. 1C, walls 136 form non-zero, oblique angles α with respect to the plane of the main panel or platform 102. In another example, the walls 136 may be substantially perpendicular to the platform. However, numerous configurations are contemplated hereby. In one example, each angle α individually may be from about 90° to about 180°. In another example, each angle α individually may be from about 90° to about 135°. In still another example, each angle α individually may be from about 135° to about 180°. In each of various other examples, each angle α individually may be from 90° to about 100°, from about 100° to about 120°, from about 120° to about 130°, from about 130° to about 140°, from about 140° to about 150°, from about 150° to about 160°, from about 160° to about 170°, or from about 170° to about 180°. In other examples, each angle α individually may be less than 90°. However, numerous other configurations are contemplated.

Figure 1C:
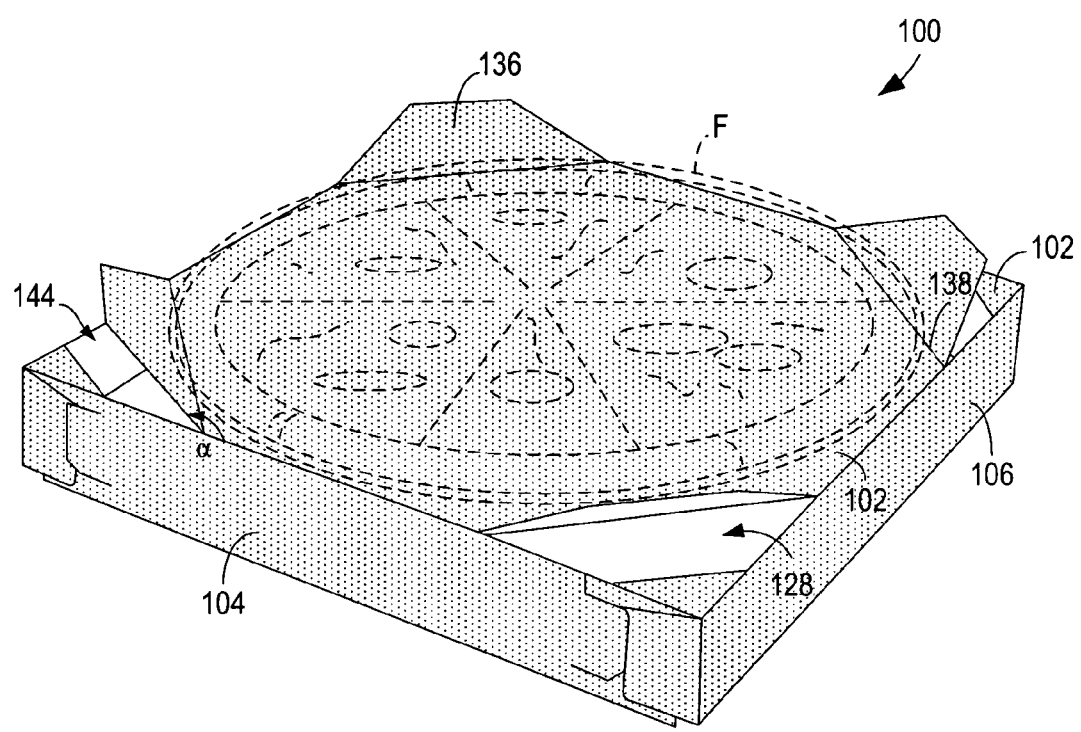
FIG. 1C is a schematic perspective view of the microwave heating construct of FIG. 1A, with the adjustable susceptor walls in an oblique upright configuration.

To use the construct 100 according to one exemplary method, a food item F (shown in dashed lines) may be placed on the main panel or platform 102, as shown in FIG. 1C. The walls 136, where used, may be adjusted as needed to bring the susceptor 132 overlying and/or defining at least a portion of the food-contacting side 134 of the walls 136 into closer proximity to the surface of the food item. The walls 136 also may assist with maintaining the food item on the platform 102 when the construct 100 is handled, for example, when the construct 100 is taken in and out of the microwave oven.

Upon sufficient exposure to microwave energy, the microwave energy interactive element 132 overlying the platform 102 and the walls 136, in this example, susceptor 132, converts at least a portion of impinging microwave energy to thermal energy to enhance the heating, browning, and/or crisping of the surface of the food item, for example, the crust of a deep dish pizza. Additionally, by maintaining the food item in an elevated position on the platform 102, the air in the void 128 between the platform 102 and the floor of the microwave oven may provide an insulating effect, thereby decreasing the amount of heat loss from the microwave energy interactive material of the susceptor 132 to the floor of the microwave oven. As a result, the heating of the food item and the browning and/or crisping of the bottom and sides of the food item may be enhanced further.

Further, where the walls 136 are used, the resulting cutouts 144 may serve as venting apertures that cooperate with the gaps 130 beneath panels 106 to enhance air circulation and to assist with the transport of water vapor or other gases away from the food item during heating, thereby improving browning and/or crisping of the food item still further. Other venting apertures may be provided as needed, and it will be understood that the number, shape, spacing, and positioning of such apertures may vary depending on the food item to be heated and the desired degree of browning and crisping, as will be discussed further below.

Figure 1D:
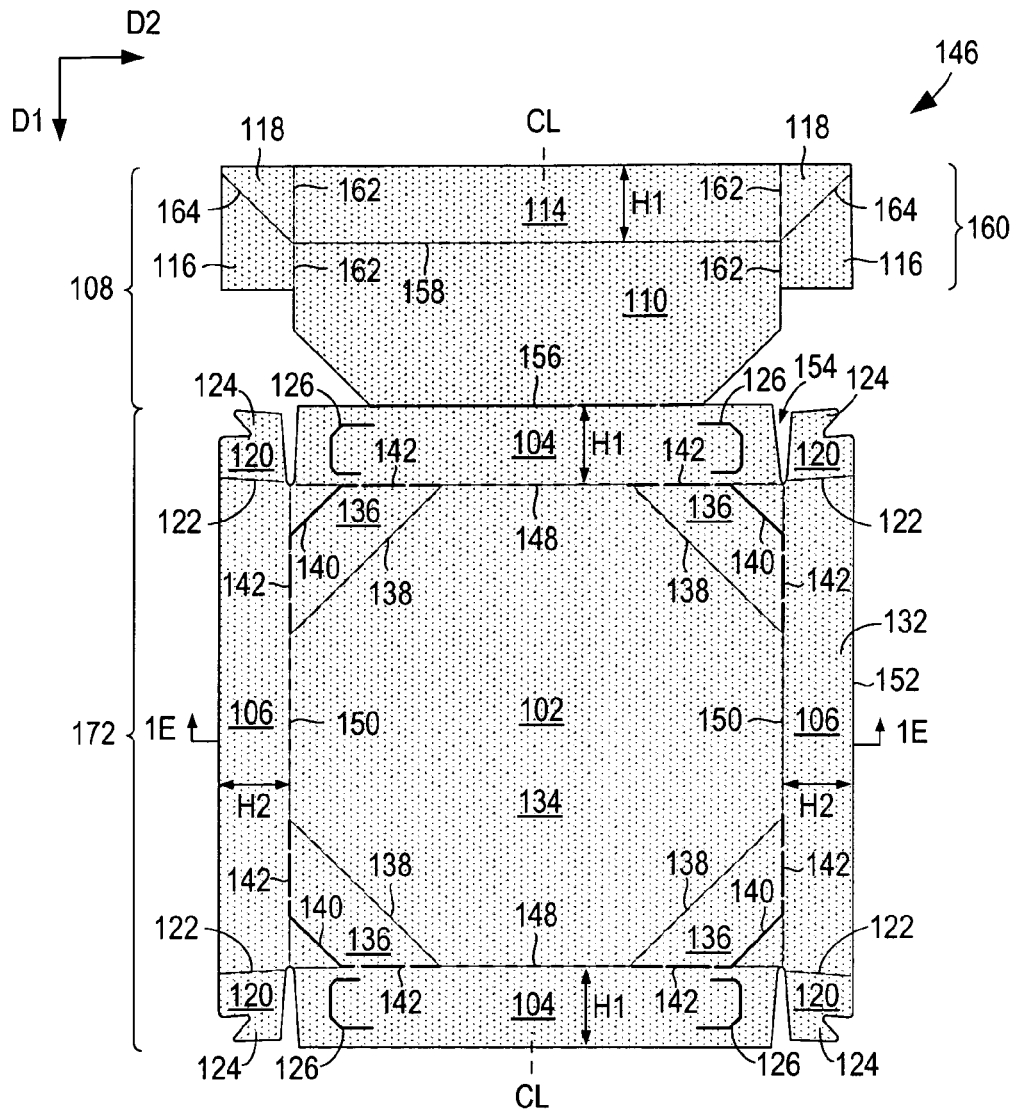
FIG. 1D is a schematic top plan view of one side of a blank that may be used to form the microwave heating construct of FIGS. 1A-1C.

FIG. 1D depicts a schematic top plan view of an exemplary blank 146 that may be used to form the construct 100 of FIG. 1A according to various aspects of the present invention. The blank 146 includes a plurality of panels joined along lines of disruption, for example, fold lines, fold lines, tear lines, score lines, or any other lines of weakening or disruption. The blank 146 and each of the various panels generally has a first dimension, for example, a length, extending in a first direction, for example, a longitudinal direction, D1, and a second dimension, for example, a width, extending in a second direction, for example, a transverse direction, D2. It will be understood that such designations are made only for convenience and do not necessarily refer to or limit the manner in which the blank is manufactured or erected into the construct. The blank 146 may be symmetric or nearly symmetric about a longitudinal centerline CL. Therefore, certain elements in the drawing figures may have similar or identical reference numerals to reflect the whole or partial symmetry.

As shown in FIG. 1D, the blank 146 includes a main panel 102 suitable, for example, for heating a pizza, sandwich, or other food item thereon. A first pair of side panels 104 extends from a first pair of substantially parallel peripheral edges of the main panel 102 along respective lines of disruption, for example, transverse fold lines 148. A second pair of side panels 106 extends from a second pair of peripheral edges along respective lines of disruption, for example, longitudinal fold lines 150, such that fold lines 148, 150 are substantially perpendicular to one another. In this example, the side panels 104, 106 and are substantially trapezoidal in shape, with the narrower "leg" or "base" of each trapezoidal panel 104 and the wider "leg" or "base" of each panel 106 defining a portion of a peripheral edge 152 of the blank 146. However, other shapes are contemplated hereby.

End flaps 120 extend from opposed longitudinal ends of each side panel 106 along respective lines of disruption, for example, oblique fold lines 122. The end flaps 120 are separated from the respectively adjacent side panels 104 by respective notches 154, each of which has a substantially triangular shape. Each end flap 120 includes a locking projection 124 dimensioned to be received within a somewhat C-shaped cut line 126 in the adjacent side panel 104.

The blank 146 also includes a plurality of lines of disruption, for example, oblique fold lines 138, longitudinal tear lines 142, oblique cut lines 140, and transverse tear lines 142, which collectively define a plurality of wall portions 136. Transverse and longitudinal tear lines 142 are substantially collinear with, and respectively interrupt, fold lines 148, 150.

The blank 146 also includes a detachable portion 108 joined to one of the side panels 104 along a tear line 156 or other line of disruption. The detachable portion 108 includes a major panel 110 and a minor panel 114 joined along a line of disruption, for example, fold line 158. Side portions 160 are joined to the major and minor panels 110, 114 along respective longitudinal lines of disruption, for example, fold lines 162. Each side portion 160 is divided into a first panel or end panel 116 and a second panel or corner panel 118 by a line of disruption, for example, an oblique fold line 164, that extends substantially between transverse fold line 158 and the peripheral edge 152 of the blank 146. The detachable portion 108 defines the transverse support element 108 of the construct 100 of FIGS. 1A-1C.

A microwave energy interactive element 132 (shown schematically by stippling), for example, a susceptor, may overlie all or a portion of the various panels of the blank 146. In this example, the microwave energy interactive element 132 overlies substantially all of one side of the blank 146 proximate to a food-contacting surface 134.

Figure 1E:
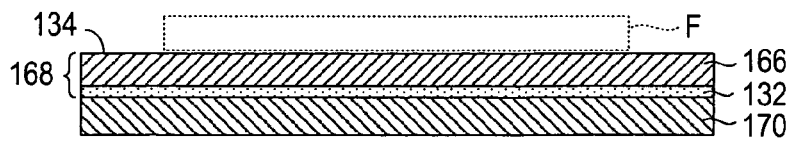
FIG. 1E is a schematic cross-sectional view of the blank of FIG. 1D.

As shown in schematic cross-sectional view in FIG. 1E, the susceptor 132 may be supported on a microwave energy transparent substrate 166, for example, a polymer film, thereby collectively forming a "susceptor film" 168. The outermost surface of the polymer film 166 may define at least a portion of a food-contacting surface or side 134 of the platform 102. The susceptor film 168 may be supported on and/or joined to a paperboard base layer 170 (or other suitable base layer) using any suitable technique, for example, using a layer of adhesive (not shown).

To form the construct 100 from the blank 146 according to one exemplary method, the detachable portion 108 may be separated from the remainder 172 of the blank 146 along tear line 156. The remainder 172 of the blank 146 may be inverted to expose the bottom side 112 of the main panel 102. The detachable portion 108 then may be positioned with the major and minor panels 110, 114 superposed with the main panel 102, and the side portions 160 superposed with side panels 106, such that fold line 158 substantially lies along and defines a transverse centerline CT, and such that fold lines 162 are adjacent to and/or substantially aligned with fold lines 150. It is noted that the detachable portion 108 is sized and positioned such that the chamfered corners of the panel 110 and the peripheral edge of panel 114 do not overlap or interfere with oblique fold lines 138.

Figure 1F:
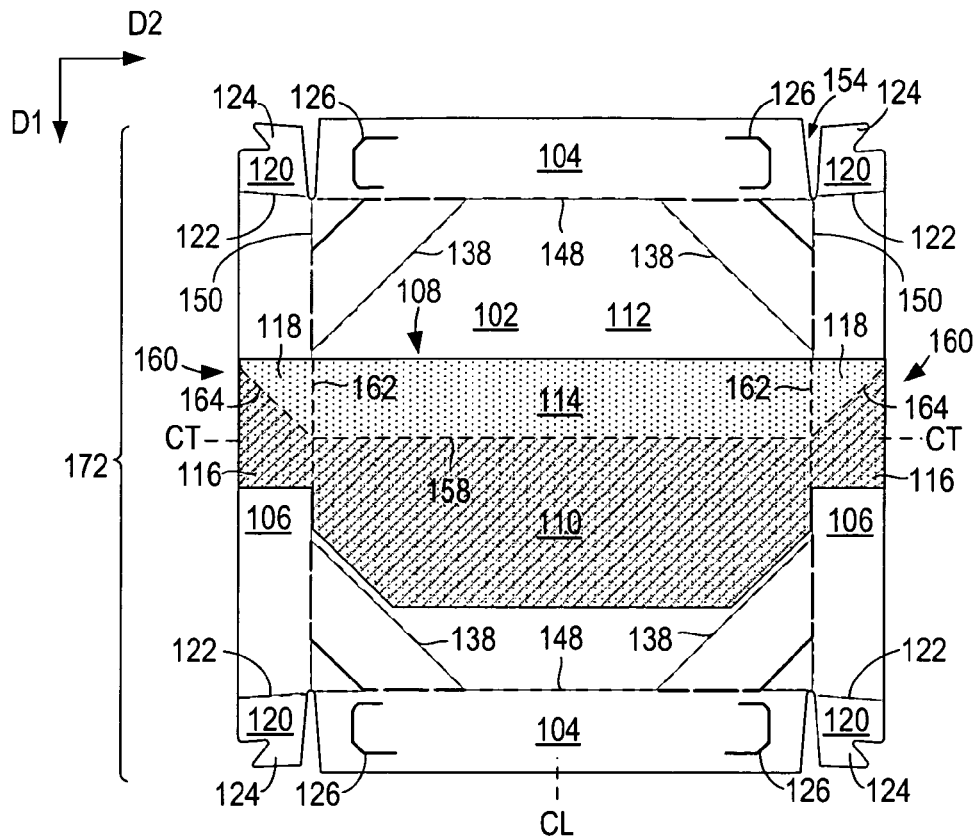
FIG. 1F schematically illustrates the microwave heating construct of FIGS. 1A-1C in a partially erected condition.

The detachable portion 108 may be joined to the remainder 172 of the blank 146 using an adhesive or otherwise, for example, in the area schematically marked with diagonal hatch lines in FIG. 1F (i.e., on a side of the detachable portion 108 facing the remainder 172 of the blank 146). In this example, the glued area includes the panels 110, 116, with panels 114, 118 remaining free to hinge along respective fold lines 158, 164.

In this example, the detachable portion 108 is positioned with the susceptor 132 facing away from panels 102, 106. However, it is contemplated that the detachable portion 108 may be positioned with the susceptor 132 facing panels 102, 106. In either case, it is contemplated that the overlapping susceptors on panels 102, 110 may generate more heat, and therefore, may enhance the heating, browning, and/or crisping of the food item in this area. It also is contemplated that the detachable portion 108 may be provided without a susceptor 132 or other microwave energy interactive element.

Figure 1G:
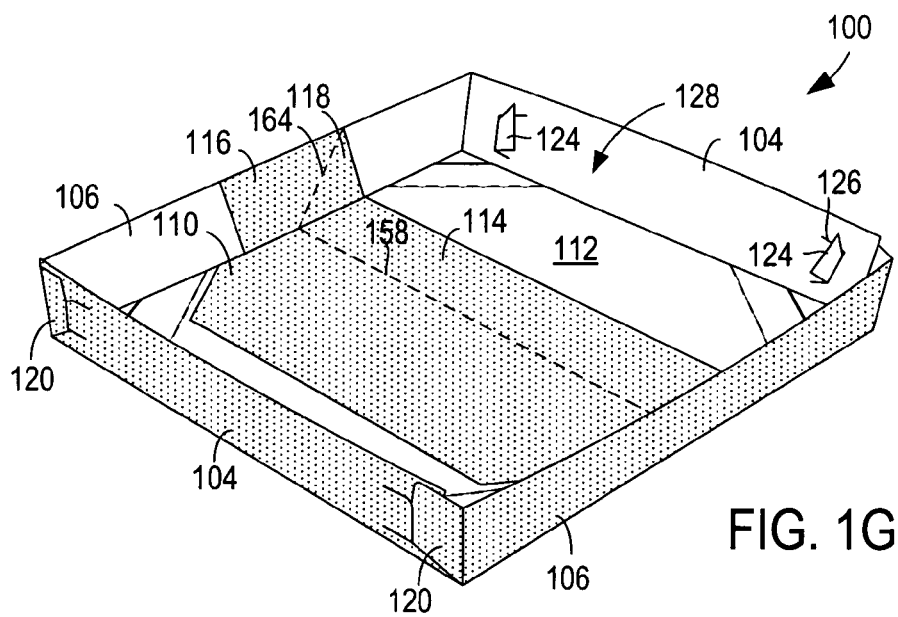
FIG. 1G schematically illustrates the microwave heating construct of FIGS. 1A-1C in a substantially erected, inverted condition, which may be suitable for use as a container for a food item.

Turning to FIG. 1G, panels 104, 106 may be folded along respective fold lines 148, 150 out of the plane of the main panel 102 away from the food-contacting surface 134. End flaps 120 may be folded inwardly towards one another along oblique fold lines 122 and the locking projections 124 may be inserted into the respective adjacent C-shaped cut lines 126 in panels 104. Alternatively, the panels 104, 120 may be joined to one another using glue, other adhesives, or any other suitable chemical or mechanical means or fasteners.

It will be noted that in this inverted, partially erected configuration, the construct resembles a tray with the main panel 102 serving as a base and the side panels 104, 106 serving as upstanding walls, all of which collectively define an interior space 128. If desired, the construct may be used in this configuration to contain the food item within the product packaging prior to use. This both potentially minimizes the dimension of the packaging and provides additional protection of the food item during shipping and handling.

In such a case, the user would simply remove the food item from the interior space 128 and lift the center support panel 114 towards panel 110 to bring the panel 114 into a substantially upright configuration, as shown in FIG. 1B. In doing so, the corner panels 118 are folded along respective fold lines 164 and brought towards the end panels 116, which are joined to panels 106. The construct 100 then may be inverted and used as described above.

Any of such structures or constructs may be formed from various materials, provided that the materials are substantially resistant to softening, scorching, combusting, or degrading at typical microwave oven heating temperatures, for example, at from about 250° F. to about 425° F. The materials may include microwave energy interactive materials, for example, those used to form susceptors and other microwave energy interactive elements, and microwave energy transparent or inactive materials, for example, those used to form the remainder of the construct.

The microwave energy interactive material may be an electroconductive or semiconductive material, for example, a metal or a metal alloy provided as a metal foil; a vacuum deposited metal or metal alloy; or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the microwave energy interactive material may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the microwave energy interactive material may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

While susceptors (e.g., susceptor 132) are illustrated herein, the various constructs also may include a foil or high optical density evaporated material having a thickness sufficient to reflect a substantial portion of impinging microwave energy. Such elements are typically formed from a conductive, reflective metal or metal alloy, for example, aluminum, copper, or stainless steel, in the form of a solid "patch" generally having a thickness of from about 0.000285 inches to about 0.05 inches, for example, from about 0.0003 inches to about 0.03 inches. Other such elements may have a thickness of from about 0.00035 inches to about 0.020 inches, for example, 0.016 inches. Such microwave energy reflecting elements may be used where the food item is prone to scorching or drying out during heating and therefore, may be referred to as shielding elements. Smaller microwave energy reflecting elements may be used to diffuse or lessen the intensity of microwave energy.

A plurality of smaller microwave energy reflecting elements also may be arranged to form a microwave energy distributing element to direct microwave energy to specific areas of the food item. If desired, the loops may be of a length that causes microwave energy to resonate, thereby enhancing the distribution effect. Microwave energy distributing elements are described in U.S. Pat. Nos. 6,204,492, 6,433,322, 6,552,315, and 6,677,563, each of which is incorporated by reference in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food item selectively. The breaks or apertures may extend through the entire structure, or only through one or more layers. The number, shape, size, and positioning of such breaks or apertures may vary for a particular application depending on the type of construct being formed, the food item to be heated therein or thereon, the desired degree of shielding, browning, and/or crisping, whether direct exposure to microwave energy is needed or desired to attain uniform heating of the food item, the need for regulating the change in temperature of the food item through direct heating, and whether and to what extent there is a need for venting.

It will be understood that the aperture may be a physical aperture or void (not shown) in one or more layers or materials used to form the construct, or may be a non-physical "aperture" (not shown). A non-physical aperture is a microwave energy transparent area that allows microwave energy to pass through the structure without an actual void or hole cut through the structure. Such areas may be formed by simply not applying microwave energy interactive material to the particular area, or by removing microwave energy interactive material in the particular area, or by mechanically deactivating the particular area (rendering the area electrically discontinuous). Alternatively, the areas may be formed by chemically deactivating the microwave energy interactive material in the particular area, thereby transforming the microwave energy interactive material in the area into a substance that is transparent to microwave energy (i.e., microwave energy inactive). While both physical and non-physical apertures allow the food item to be heated directly by the microwave energy, a physical aperture also provides a venting function to allow steam or other vapors to escape from the interior of the construct.

The arrangement of microwave energy interactive and microwave energy transparent areas may be selected to provide various levels of heating, as needed or desired for a particular application. For example, where greater heating is desired, the total inactive (i.e., microwave energy transparent) area may be increased. In doing so, more microwave energy is transmitted to the food item. Alternatively, by decreasing the total inactive area, more microwave energy is absorbed by the microwave energy interactive areas, converted into thermal energy, and transmitted to the surface of the food item to enhance heating, browning, and/or crisping.

In some instances, it may be beneficial to create one or more discontinuities or inactive regions to prevent overheating or charring of the construct. By way of example, and not limitation, in the construct 100 illustrated in FIGS. 1A-1C, the corner panels 118 of the transverse support element 108 may be in a substantially facing, contacting, relationship with the end panels 116 when the center support panel 114 is in a fully upright condition. When exposed to microwave energy, the concentration of heat generated by the overlapped panels may be sufficient to cause the underlying support, in this case, paperboard, to become scorched. As such, the overlapping portions of one or both of panels 116, 118 may be designed to be microwave energy transparent, for example, by forming these areas without a microwave energy interactive material, by removing any microwave energy interactive material that has been applied, or by deactivating the microwave energy interactive material in these areas.

Further still, one or more panels, portions of panels, or portions of the construct may be designed to be microwave energy inactive to ensure that the microwave energy is focused efficiently on the areas to be browned and/or crisped, rather than being lost to portions of the food item not intended to be browned and/or crisped or to the heating environment. This may be achieved using any suitable technique, such as those described above. By way of example, and not limitation, in the example illustrated in FIGS. 1A-1C, any of panels 104, 106, 110, 114, 116, 118, 120 may be microwave energy inactive since such areas are not likely to be in proximate or intimate contact with the primary areas of the food item intended to be browned and/or crisped.

As stated above, the microwave energy interactive element (e.g., susceptor 132) may be supported on a microwave inactive or transparent substrate (e.g., polymer film 166) for ease of handling and/or to prevent contact between the microwave energy interactive material and the food item. The outermost surface of the polymer film may define at least a portion of the food-contacting surface of the package (e.g., surface 134). Examples of polymer films that may be suitable include, but are not limited to, polyolefins, polyesters, polyamides, polyimides, polysulfones, polyether ketones, cellophanes, or any combination thereof. In one particular example, the polymer film comprises polyethylene terephthalate. The thickness of the film generally may be from about 35 gauge to about 10 mil. In each of various examples, the thickness of the film may be from about 40 to about 80 gauge, from about 45 to about 50 gauge, about 48 gauge, or any other suitable thickness. Other non-conducting substrate materials such as paper and paper laminates, metal oxides, silicates, cellulosics, or any combination thereof, also may be used.

The microwave energy interactive material may be applied to the substrate in any suitable manner, and in some instances, the microwave energy interactive material is printed on, extruded onto, sputtered onto, evaporated on, or laminated to the substrate. The microwave energy interactive material may be applied to the substrate in any pattern, and using any technique, to achieve the desired heating effect of the food item. For example, the microwave energy interactive material may be provided as a continuous or discontinuous layer or coating including circles, loops, hexagons, islands, squares, rectangles, octagons, and so forth.

Numerous materials may serve as the base layer 170 in the various structures and constructs. In one example, the base layer comprises paperboard having a basis weight of from about 60 to about 330 lbs/ream, for example, from about 80 to about 140 lbs/ream. The paperboard generally may have a thickness of from about 6 to about 30 mils, for example, from about 12 to about 28 mils. In one particular example, the paperboard has a thickness of about 12 mils. Any suitable paperboard may be used, for example, a solid bleached or solid unbleached sulfate board, such as SUS® board, commercially available from Graphic Packaging International.

The package may be formed according to numerous processes known to those in the art, including using adhesive bonding, thermal bonding, ultrasonic bonding, mechanical stitching, or any other suitable process. Any of the various components used to form the package may be provided as a sheet of material, a roll of material, or a die cut material in the shape of the package to be formed (e.g., a blank).

It will be understood that with some combinations of elements and materials, the microwave energy interactive element may have a grey or silver color that is visually distinguishable from the substrate or the support. However, in some instances, it may be desirable to provide a package having a uniform color and/or appearance. Such a package may be more aesthetically pleasing to a consumer, particularly when the consumer is accustomed to packages or containers having certain visual attributes, for example, a solid color, a particular pattern, and so on. Thus, for example, the present disclosure contemplates using a silver or grey toned adhesive to join the microwave energy interactive element to the support, using a silver or grey toned support to mask the presence of the silver or grey toned microwave energy interactive element, using a dark toned substrate, for example, a black toned substrate, to conceal the presence of the silver or grey toned microwave energy interactive element, overprinting the metallized side of the polymer film with a silver or grey toned ink to obscure the color variation, printing the non-metallized side of the polymer film with a silver or grey ink or other concealing color in a suitable pattern or as a solid color layer to mask or conceal the presence of the microwave energy interactive element, or any other suitable technique or combination of techniques.

Although certain embodiments of this invention have been described with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other.

It will be understood that in each of the various blanks and constructs described herein and contemplated hereby, a "fold line" can be any substantially linear, although not necessarily straight, form of weakening that facilitates folding thereal-ong. More specifically, but not for the purpose of narrowing the scope of the present invention, a fold line may be a score line, such as lines formed with a blunt scoring knife, or the like, which creates a crushed portion in the material along the desired line of weakness, a cut that extends partially into a material along the desired line of weakness, and/or a series of cuts that extend partially into and/or completely through the material along the desired line of weakness; or any combination of these features.

For example, one type of conventional tear line is in the form of a series of cuts that extend completely through the material, with adjacent cuts being spaced apart slightly so that a nick (e.g., a small somewhat bridging-like piece of the material) is defined between the adjacent cuts for typically temporarily connecting the material across the tear line. The nicks are broken during tearing along the tear line. Such a tear line that includes nicks can also be referred to as a cut line, since the nicks typically are a relatively small percentage of the subject line, and alternatively the nicks can be omitted from such a cut line.

Furthermore, various exemplary blanks and constructs are shown and described herein as having fold lines, tear lines, score lines, cut lines, kiss cut lines, and other lines as extending from a particular feature to another particular feature, for example from one particular panel to another, from one particular edge to another, or any combination thereof. However, it will be understood that such lines need not necessarily extend between such features in a precise manner. Instead, such lines may generally extend between the various features as needed to achieve the objective of such line. For instance, where a particular tear line is shown as extending from a first edge of a blank to another edge of the blank, the tear line need not extend completely to one or both of such edges. Rather, the tear line need only extend to a location sufficiently proximate to the edge so that the removable or at least partially separable strip, panel, or portion can be manually separated from the blank or construct without causing undesirable damage.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention.

What is claimed is:

1. A microwave heating construct, comprising:
   a platform including microwave energy interactive material, the microwave energy interactive material being operative for converting microwave energy into thermal energy; and
   a plurality of elevating panels joined to the platform,
   wherein the platform includes a movable portion defined at least partially by
   a first line of disruption extending substantially between a pair of adjacent peripheral edges of the platform,
   a second line of disruption extending between the pair of adjacent peripheral edges of the platform, and
   lines of disruption extending between respective endpoints of the first line of disruption and the second line of disruption along the respective peripheral edge of the platform,
   wherein the movable portion of the platform is operative for pivoting along the first line of disruption.

2. The construct of claim 1, wherein
   the first line of disruption is a fold line, and
   the second line of disruption is a cut.

3. The construct of claim 1, wherein the lines of disruption extending between respective endpoints of the first line of disruption and the second line of disruption each comprise at least one of a tear line and cut.

4. The construct of claim 1, wherein the first line of disruption is substantially parallel to the second line of disruption and the adjacent peripheral edges are substantially perpendicular to one another, such that the movable portion of the platform is substantially trapezoidal in shape.

5. The construct of claim 1, wherein the movable portion of the platform is operative for pivoting upwardly towards a center of the platform.

6. The construct of claim 5, wherein the movable portion of the platform is operative for forming an angle with respect to the platform of from about 90° to about 180°.

7. The construct of claim 1, wherein the movable portion of the platform is a first movable portion of a plurality of movable portions of the platform.

8. The construct of claim 7, wherein
the platform includes a plurality of corners defined by adjacent pairs of peripheral edges, and
the movable portions of the platform are each adjacent to one corner of the plurality of corners of the platform.

9. The construct of claim 1, wherein the plurality of elevating panels includes a central elevating panel for supporting a center of the platform.

10. The construct of claim 9, wherein the plurality of elevating panels further includes a first pair of peripheral elevating panels extending downwardly from respective peripheral edges of the platform, wherein the central elevating panel extends between the first pair of peripheral elevating panels.

11. The construct of claim 10, wherein the plurality of elevating panels further includes a second pair of peripheral elevating panels extending downwardly from respective peripheral edges of the platform.

12. The construct of claim 11, wherein
the first pair of peripheral elevating panels and the central elevating panel have a vertical dimension substantially equal to one another, and
the second pair of peripheral elevating panels have a vertical dimension that is less than the vertical dimension of the first pair of peripheral elevating panels and the central elevating panel.

13. The construct of claim 1, wherein the microwave energy interactive material has a thickness of from about 60 to about 100 angstroms.

14. The construct of claim 1, in combination with a food item, wherein the food item has a surface that is desirably at least one of browned and crisped, wherein the food item is seated on the platform so that the microwave energy interactive material of the platform is proximate to the surface of the food item that is desirably at least one of browned and crisped.

15. A method of using the combination of claim 14, comprising:
moving the movable portion of the platform towards the surface of the food item, and
exposing the food item on the platform to microwave energy, so that the microwave energy interactive material converts at least a portion of the microwave energy into thermal energy and at least one of browns and crisps the surface of the food item.

16. The method of claim 15, wherein moving the movable portion of the platform towards the surface of the food item comprises pivoting the movable portion of the platform towards the food item along the first line of disruption.

17. The construct of claim 1, in combination with a food item, wherein
the platform includes
a first side for receiving the food item when heating the food item in a microwave oven, and
a second side opposite the first side, and
the plurality of elevating panels includes
a central elevating panel for supporting a center of the platform, the central elevating panel being foldably joined to the second side of the platform, wherein the central elevating panel is operative for being moved from a first position in a substantially facing, contacting relationship with the second side of the platform to a second position substantially perpendicular to the platform, and
a plurality of peripheral elevating panels joined to the platform along the peripheral edges of the platform, wherein with the central elevating panel in the first position, the plurality of peripheral elevating panels and the second side of the platform define an interior space for containing the food item prior to heating the food item in a microwave oven.

18. A method of using the combination of claim 17, comprising:
removing the food item from the interior space,
moving the central elevating panel into the second position, and
inverting the construct so that the first side of the platform overlies the second side of the platform.

19. A microwave heating construct, comprising:
a platform including microwave energy interactive material, the microwave energy interactive material being operative for converting microwave energy into thermal energy, wherein the platform includes a movable portion defined at least partially by a line of disruption extending substantially between a pair of adjacent peripheral edges of the platform, wherein the movable portion of the platform is operative for pivoting along the line of disruption; and
a plurality of elevating panels joined to the platform, wherein the plurality of elevating panels includes
a first pair of elevating panels for extending downwardly from the platform,
a second pair of elevating panels for extending downwardly from the platform, and
a central elevating panel for supporting a center of the platform, wherein the central elevating panel extends between the first pair of panels,
wherein
the first pair of elevating panels and the central elevating panel have a substantially equal vertical dimension, and
the second pair of elevating panels have a vertical dimension that is less than the vertical dimension of the first pair of elevating panels and the central elevating panel.

20. The construct of claim 19, wherein
the line of disruption is a first line of disruption, and
the movable portion is further defined by a second line of disruption extending between the pair of adjacent peripheral edges of the platform.

21. The construct of claim 20, wherein
the first line of disruption is a fold line, and
the second line of disruption is a cut.

22. The construct of claim 20, wherein the movable portion is further defined by lines of disruption extending between respective endpoints of the first line of disruption and the second line of disruption along the respective peripheral edge of the platform.

23. The construct of claim 22, wherein the lines of disruption extending between respective endpoints of the first line of disruption and the second line of disruption each comprise at least one of a tear line and cut.

24. The construct of claim 22, wherein the first line of disruption is substantially parallel to the second line of disruption and the adjacent peripheral edges are substantially perpendicular to one another, such that the movable portion of the platform is substantially trapezoidal in shape.

25. The construct of claim 19, wherein the movable portion of the platform is operative for pivoting upwardly towards a center of the platform.

26. The construct of claim 25, wherein the movable portion of the platform is operative for forming an angle with respect to the platform of from about 90° to about 180°.

27. The construct of claim 19, wherein the movable portion of the platform is a first movable portion of a plurality of movable portions of the platform.

28. The construct of claim 27, wherein
the platform includes a plurality of corners defined by adjacent pairs of peripheral edges, and
the movable portions of the platform are each adjacent to one corner of the plurality of corners of the platform.

29. The construct of claim 19, wherein the microwave energy interactive material has a thickness of from about 60 to about 100 angstroms.

30. The construct of claim 19, in combination with a food item, wherein the food item has a surface that is desirably at least one of browned and crisped, wherein the food item is seated on the platform so that the microwave energy interactive material of the platform is proximate to the surface of the food item that is desirably at least one of browned and crisped.

31. A method of using the combination of claim 30, comprising:
moving the movable portion of the platform towards the surface of the food item, and
exposing the food item on the platform to microwave energy, so that the microwave energy interactive material converts at least a portion of the microwave energy into thermal energy and at least one of browns and crisps the surface of the food item.

32. The method of claim 31, wherein moving the movable portion of the platform towards the surface of the food item comprises pivoting the movable portion of the platform towards the food item along the line of disruption.

33. The construct of claim 19, in combination with a food item, wherein
the platform includes a first side for receiving the food item when heating the food item in a microwave oven, and a second side opposite the first side,
the central elevating panel is operative for being moved from a first position in a substantially facing, contacting relationship with the second side of the platform to a second position substantially perpendicular to the platform, and
with the central elevating panel in the first position, the plurality of peripheral elevating panels and the second side of the platform define an interior space for containing the food item prior to heating the food item in a microwave oven.

34. A method of using the combination of claim 33, comprising:
removing the food item from the interior space,
moving the central elevating panel into the second position, and
inverting the construct so that the first side of the platform overlies the second side of the platform.

35. A microwave heating construct, comprising:
a platform including microwave energy interactive material, wherein the microwave energy interactive material is operative for converting microwave energy into heat; and
a plurality of elevating panels extending downwardly from the platform,
wherein
the platform is substantially square in shape, such that the platform includes corners and peripheral edges extending between adjacent pairs of the corners; and
the platform includes movable portions operative for bringing the microwave energy interactive material of the movable portions towards a center of the platform, wherein each movable portion is positioned adjacent to one of the corners of the platform, and wherein each movable portion is defined at least partially by
a first line of disruption extending substantially between a pair of adjacent peripheral edges of the platform,
a second line of disruption extending between the pair of adjacent peripheral edges of the platform, wherein the second line of disruption is substantially parallel to the first line of disruption, and
a pair of lines of disruption extending between respective endpoints of the first line of disruption and the second line of disruption along the respective peripheral edge of the platform.

36. The construct of claim 35, wherein
the first line of disruption is a fold line,
the second line of disruption is a cut, and
the pair of lines of disruption extending between respective endpoints of the first line of disruption and the second line of disruption each comprise at least one of a tear line and cut.

37. The construct of claim 35, wherein the plurality of elevating panels includes
a first pair of peripheral elevating panels and a second pair of peripheral elevating panels opposite one another, and
a central elevating panel extending between the first pair of panels,
wherein
the first pair of peripheral elevating panels and the central elevating panel have a substantially equal vertical dimension, and
the second pair of peripheral elevating panels have a vertical dimension that is less than the vertical dimension of the first pair of peripheral elevating panels and the central elevating panel.

38. The construct of claim 35, in combination with a food item, wherein the food item has a surface that is desirably at least one of browned and crisped, wherein the food item is seated on the platform so that the microwave energy interactive material of the platform is proximate to the surface of the food item that is desirably at least one of browned and crisped.

39. A method of using the combination of claim 38, comprising:
moving the movable portions of the platform towards the surface of the food item, and
exposing the food item on the platform to microwave energy, so that the microwave energy interactive material converts at least a portion of the microwave energy into thermal energy and at least one of browns and crisps the surface of the food item.

40. The method of claim 39, wherein moving the movable portion of the platform towards the surface of the food item comprises pivoting the movable portion of the platform towards the food item along the first line of disruption.

41. The construct of claim 35, in combination with a food item, wherein
the platform includes
a first side for receiving the food item when heating the food item in a microwave oven, and
a second side opposite the first side, and
the plurality of elevating panels includes
a central elevating panel for supporting a center of the platform, the central elevating panel being foldably joined to the second side of the platform, wherein the central elevating panel is operative for being moved from a first position in a substantially facing, contacting relationship with the second side of the platform to a second position substantially perpendicular to the platform, and
a plurality of peripheral elevating panels joined to the platform along the peripheral edges of the platform, wherein with the central elevating panel in the first position, the plurality of peripheral elevating panels and the second side of the platform define an interior space for containing the food item prior to heating the food item in a microwave oven.

42. A method of using the combination of claim 41, comprising:
removing the food item from the interior space,
moving the central elevating panel into the second position, and
inverting the construct so that the first side of the platform overlies the second side of the platform.

43. A microwave heating construct, comprising:
a platform including microwave energy interactive material, the microwave energy interactive material being operative for converting microwave energy into heat, wherein the platform includes a plurality of movable portions for bringing the microwave energy interactive material of the movable portions towards a center of the platform, each movable portion being defined at least partially by
a first line of disruption extending substantially between a pair of adjacent peripheral edges of the platform,
a second line of disruption extending between the pair of adjacent peripheral edges of the platform, wherein the second line of disruption is substantially parallel to the first line of disruption, and
a pair of lines of disruption extending between respective endpoints of the first line of disruption and the second line of disruption along the respective peripheral edge of the platform; and
a plurality of elevating panels extending downwardly from the platform, the plurality of elevating panels including
a first pair of elevating panels opposite one another,
a second pair of elevating panels opposite one another, and
a central elevating panel extending between the first pair of elevating panels, wherein
the first pair of elevating panels and the central elevating panel are substantially equal in height, and
the second pair of elevating panels have a height that is less than the height of the first pair of elevating panels and the central elevating panel.

44. The construct of claim 43, wherein
the first line of disruption is a fold line,
the second line of disruption is a cut, and
the pair of lines of disruption extending between respective endpoints of the first line of disruption and the second line of disruption each comprise at least one of a tear line and cut.

45. The construct of claim 43, in combination with a food item, wherein the food item has a surface that is desirably at least one of browned and crisped, wherein the food item is positioned on the platform so that the microwave energy interactive material of the platform is proximate to the surface of the food item that is desirably at least one of browned and crisped.

46. A method of using the combination of claim 45, comprising:
folding the movable portion of the platform towards the surface of the food item along the first line of disruption, and
exposing the food item on the platform to microwave energy, so that the microwave energy interactive material converts at least a portion of the microwave energy into heat and at least one of browns and crisps the surface of the food item.

47. The construct of claim 43, in combination with a food item, wherein the platform includes
a first side for receiving the food item when heating the food item in a microwave oven, and
a second side opposite the first side,
wherein the central elevating panel is operative for being transitioned from a first position in a substantially facing, contacting relationship with the second side of the platform to a second position substantially perpendicular to the platform, so that the first pair of elevating panels, second pair of elevating panels, and second side of the platform define a space for containing the food item prior to heating the food item in a microwave oven.

48. A method of using the combination of claim 47, comprising:
removing the food item from the space,
moving the central elevating panel into the second position,
inverting the construct so that the first side of the platform overlies the second side of the platform,
moving the movable portion of the platform towards the surface of the food item along the first line of disruption, and
exposing the food item on the platform to microwave energy, so that the microwave energy interactive material converts at least a portion of the microwave energy into heat and at least one of browns and crisps the surface of the food item.

49. A microwave heating construct, comprising:
a platform including microwave energy interactive material, the microwave energy interactive material being operative for converting microwave energy into heat, wherein the platform includes a movable portion defined at least partially by a line of disruption extending substantially between a pair of adjacent peripheral edges of the platform, wherein the movable portion of the platform is operative for pivoting along the line of disruption; and
a plurality of support panels foldably joined to the platform, the plurality of support panels including
a first pair of support panels opposite one another,
a second pair of support panels opposite one another, and
a central support panel extending between the first pair of elevating panels, wherein
in a first configuration, the first pair of support panels and the second pair of support panels extend upwardly from the base and central support panel is in a flattened configuration adjacent to the platform, so that the first pair of support panels and the second pair of support panels define an interior space for receiving a food item, and in a second configuration, the first pair of support panels, second pair of support panels, and central support panel extend downwardly from the base, wherein the first pair of elevating panels and the central elevating panel are substantially equal in height, and the second pair of elevating panels have a height that is less than the height of the first pair of elevating panels and the central elevating panel.

50. The construct of claim 49, wherein
the line of disruption is a first line of disruption, and
the movable portion is further defined by a second line of disruption extending between the pair of adjacent peripheral edges of the platform.

51. The construct of claim 50, wherein
the first line of disruption is a fold line, and
the second line of disruption is a cut.

52. The construct of claim 50, wherein the movable portion is further defined by lines of disruption extending between respective endpoints of the first line of disruption and the second line of disruption along the respective peripheral edge of the platform.

53. The construct of claim 52, wherein the lines of disruption extending between respective endpoints of the first line of disruption and the second line of disruption each comprise at least one of a tear line and cut.

54. The construct of claim 49, wherein
the platform includes a plurality of corners defined by adjacent pairs of peripheral edges,
the movable portion of the platform is a first movable portion of a plurality of movable portions of the platform, and
the movable portions of the platform are each adjacent to one corner of the plurality of corners of the platform.

55. The construct of claim 49, wherein the food item is seated on the platform so that the microwave energy interactive material of the platform is proximate to the surface of the food item that is desirably at least one of browned and crisped.

56. A method of using the construct of claim 49, in combination with a food item, wherein the food item has a surface that is desirably at least one of browned and crisped, wherein the construct is in the first configuration with food item in the interior space, the method comprising:
removing the food item from the interior space,
moving the central elevating panel into the second position, and
inverting the construct;
removing the food item from the space,
moving the central elevating panel and inverting the construct so that the first pair of support panels, second pair of support panels, and central support panel extend downwardly from the base,
positioning the food item on the platform so that the microwave energy interactive material of the platform is proximate to the surface of the food item that is desirably at least one of browned and crisped,
moving the movable portion of the platform towards the surface of the food item, and
exposing the food item on the platform to microwave energy, so that the microwave energy interactive material converts at least a portion of the microwave energy into heat and at least one of browns and crisps the surface of the food item.

* * * * *